(12) United States Patent
Biermann et al.

(10) Patent No.: US 7,261,945 B2
(45) Date of Patent: Aug. 28, 2007

(54) IMPACT RESISTANT FLEXIBLE BODY DEVICE

(75) Inventors: Paul J. Biermann, Columbia, MD (US); Jack C. Roberts, Columbia, MD (US); Richard Reidy, Denton, TX (US)

(73) Assignee: The Johns Hopkins University, Baltimore, MD (US)

( * ) Notice: Subject to any disclaimer, the term of this patent is extended or adjusted under 35 U.S.C. 154(b) by 353 days.

(21) Appl. No.: 10/832,625

(22) Filed: Apr. 27, 2004

(65) Prior Publication Data

US 2007/0172677 A1 Jul. 26, 2007

Related U.S. Application Data

(60) Provisional application No. 60/466,081, filed on Apr. 28, 2003.

(51) Int. Cl.
*B32B 9/00* (2006.01)
*B32B 15/01* (2006.01)

(52) U.S. Cl. .................................. 428/469

(58) Field of Classification Search ............... None
See application file for complete search history.

(56) References Cited

U.S. PATENT DOCUMENTS

| | | | |
|---|---|---|---|
| 2,723,214 A | 11/1955 | Meyer | |
| 3,894,472 A | 7/1975 | Davis | |
| 4,633,528 A | 1/1987 | Brandt | |
| 4,923,728 A | 5/1990 | Snedeker | |
| 5,187,023 A | 2/1993 | Prevorsek | |
| 5,196,252 A | 3/1993 | Harpell | |
| 5,362,527 A | 11/1994 | Harpell | |
| 5,376,426 A | 12/1994 | Harpell | |
| 5,804,757 A | 9/1998 | Wynne | |
| 5,853,863 A | 12/1998 | Kim | |
| 5,906,873 A | 5/1999 | Kim | |
| 6,035,438 A * | 3/2000 | Neal et al. ..................... 2/2.5 |
| 6,266,818 B1 * | 7/2001 | Howland et al. ............... 2/2.5 |
| 6,357,332 B1 | 3/2002 | Vecchio | |
| 6,440,343 B2 | 8/2002 | Logan | |
| 6,609,452 B1 | 8/2003 | McCormick | |
| 6,641,893 B1 | 11/2003 | Suresh | |
| 2001/0053645 A1 * | 12/2001 | Henderson .................. 442/135 |
| 2002/0178900 A1 | 12/2002 | Ghiorse | |
| 2003/0110931 A1 | 6/2003 | Aghajanian | |
| 2003/0150321 A1 | 8/2003 | Lucuta | |

FOREIGN PATENT DOCUMENTS

CA 2259486 1/1998

OTHER PUBLICATIONS

Subramanian et al., "Iron aluminide- Al2O3 composites by insitu displacement reactions: processing and mechanical properties", Materials Science and Engineering A. 254. (1998). pp. 119-128.*

(Continued)

*Primary Examiner*—Jennifer McNeil
*Assistant Examiner*—Jonathan Langman
(74) *Attorney, Agent, or Firm*—Albert J. Fasulo, II

(57) ABSTRACT

An impact resistant device is provided comprising a flexible support matrix and a plurality of energy absorbing elements operatively connected to the support matrix, each element comprising at least one ceramic material and at least one strain rate sensitive material. The impact resistant device can be worn as body armor to protect the wearer from high velocity projectiles.

30 Claims, 3 Drawing Sheets

OTHER PUBLICATIONS

Liu et al, "Study of Dynamic Mechanical Behavior of Fe3Al Under Tensile Impact", J. of Materials Science Letters, 1999, pp. 1611-1613, vol. 18, U. of Sci. and Tech. of China.

Ben-Dor et al, "Optimization of Two Component Ceramic Armor for a Given Impact Velocity", Theoretical and Applied Fracture Mechanics, 2000, pp. 185-190, vol. 33, Elsevier.

Hetherington et al, "An Investigation into the Energy Absorbed during Ballistic Perforation of Composite Armours", Int. J. Impact Engng, 1991, pp. 33-40; vol. 11, No. 1; Pergamon, Press.

Neshpor et al, "Armour Ceramics Ballistic Efficiency Evaluation", 8th CIMTEC-World Ceramics Congress and Forum on New Materials, 1994, pp. 2395-2401, Florence, Italy.

Baligidad et al, "Processing of Fe3Al Based Intermetallic Alloys through Electroslag Remelting", ISIJ Int, 1996, pp. 1448-1452; vol. 36, No. 12; The Iron and Steel Inst. of JP.

Florence, "Interaction of Projectiles and Composite Armor, Part II", Stanford Research Institute, 1969; Army Materials and Mechanics Research Center, Watertown, MA.

* cited by examiner

IMPACT RESISTANT FLEXIBLE BODY DEVICE

CROSS-REFERENCE TO RELATED APPLICATIONS

This application claims priority to U.S. Provisional Application Ser. No. 60/466,081, filed Apr. 28, 2003, the contents of which are incorporated by reference herein.

BACKGROUND OF THE INVENTION

1. Field of the Invention

The present invention generally relates to an impact resistant flexible body device to prevent injury from high speed projectiles.

2. Description of the Related Art

Impact resistant body armor is known in the art. Various types of body armor are worn, for example, by police and military personnel, to prevent injury from high speed projectiles such as bullets and shrapnel. Such body armor typically includes a ballistic fabric made from aramid fibers such as KEVLAR® (available from E.I. Dupont de Nemours & Co. of Chattanooga, Tenn.), fibers of ultrahigh molecular weight polyethylene (UHMWPE) such as, e.g., SPECTRA® (available from Allied Signal of Morristown N.J., or other such ballistic fabric material.

Present body armor in use can defeat only lower energy projectiles unless large, inflexible plates are added to the outside of the body armor to withstand high energy projectiles. The plates cannot be easily or affordably tailored to the individual body shapes of the wearers and cannot cover large areas of the body where a large range of motion occurs such as, for example, at the groin or shoulder area. Moreover, current armor with the inflexible plates does not effectively disperse impact energy or prevent shock waves from damaging sensitive internal organs. Of special concern are the high velocity rounds of military weapons. Typical military rounds (full metal jacket, 7.62 x 51 mm, 150 grains) travel at up to about 850 m/s. Accordingly, it would be desirable to provide an improved body armor device to protect the wearer from such high velocity projectiles and yet allow freedom of motion.

SUMMARY OF THE INVENTION

An impact resistant device is provided herein. Accordingly, an impact resistant device of the present invention comprises a plurality of energy absorbing elements operatively connected to a flexible support. Each element comprises at least one ceramic material and at least one strain rate sensitive material.

The impact resistant device of the present invention advantageously protects the wearer from high velocity projectiles in such environments as, for example, military and law enforcement environments.

BRIEF DESCRIPTION OF THE DRAWINGS

Various embodiments are described below with reference to the drawings wherein.

DETAILED DESCRIPTION OF THE PREFERRED EMBODIMENT(S)

Figure 1:
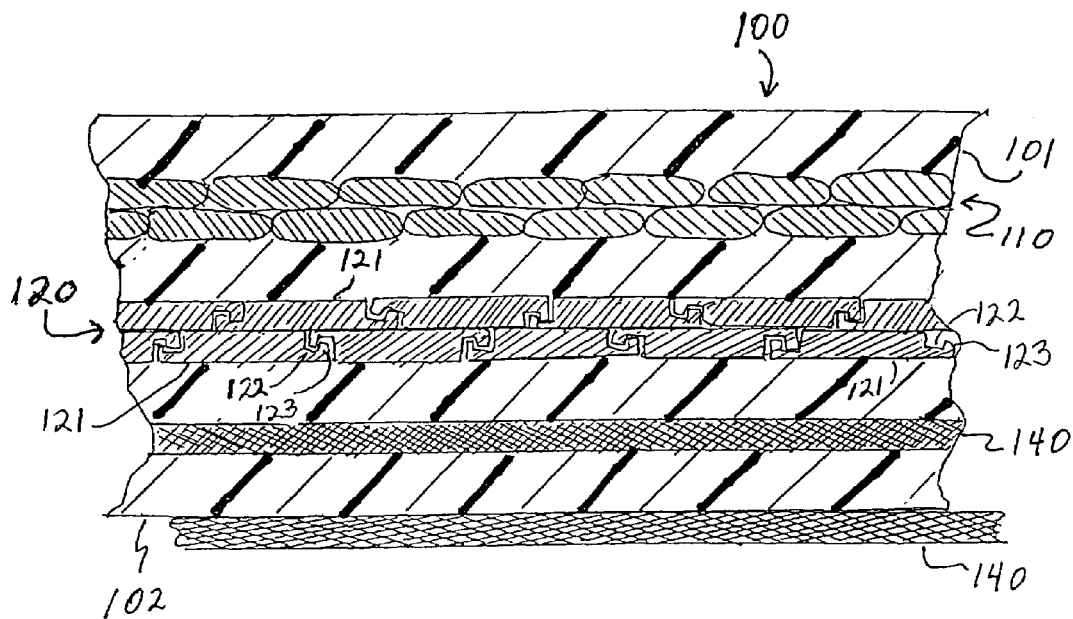
FIG. 1 is a side sectional view of an impact resistant device of the invention.

The impact resistant device of the present invention comprises discrete, substantially hard, high fracture toughness, impact resistant energy absorbing elements 110. Referring now to FIG. 1, a section of an impact resistant device 100 suitable for use, for example, as body armor, is generally depicted which comprises a support matrix 101 to which is operatively connected a plurality of energy absorbing elements 110 arranged in multiple layers in an imbricated pattern. The support matrix will ordinarily include at least a plastic material which is easily deformable at ambient conditions. For example, support matrix 101 can be flexible polymer sheets as known in the art and readily available with the energy absorbing elements 110 being operatively connected thereto by embedding elements 110 in the polymer matrix. Alternatively, support matrix 101 can be a fabric such as a ballistic fabric to which the energy absorbing elements are bonded by way of an adhesive. The flexible support matrix is configured and dimensioned to be worn by a human being (e.g., as vest 200 in FIG. 4).

A polymer matrix 101 can be embedded with at least two layers of energy absorbing elements 110 which comprise multiple layers of ceramic and strain rate sensitive materials. The term "strain rate sensitive" as used herein shall be understood to mean that the polymer is relatively more flexible under normal loads, but which becomes relatively hard under a high strain rate, e.g., when impacted by a high speed projectile. The hardening of the strain rate sensitive material advantageously helps distribute the impact energy of the projectile over a wider area, thereby reducing the likelihood of penetration. Suitable ceramic materials include, but are not limited to, alumina ($Al_2O_3$), boron nitride (BN), zirconium oxide ($ZrO_2$) and the like and combinations thereof. Preferably, the zirconium oxide is stabilized with a dopant oxide such as, for example, yttria ($Y_2O_3$), calcium oxide (CaO), magnesium oxide (MgO), or ceria ($CeO_2$). Most preferred for use herein is a yttria stabilized zirconia ("YSZ") which is incorporated with a sufficient amount of alumina. A strain rate sensitive material preferred for use in the energy absorbing element is a metal composition such as iron aluminide compounds (e.g., $Fe_3Al$). The strain rate sensitive material of energy absorbing elements 110 can also include modifiers such as titanium boride ($TiB_2$) particles and/or chromium in the aluminide compounds. Another strain rate sensitive material for use in energy absorbing elements 110 can be a strain rate sensitive polymer, preferably a polymer having a modulus of elasticity of at least 3GPa at 1000 $sec^{-1}$ strain rate. Suitable polymers for use in the energy absorbing elements include polyether ether ketone, or "PEEK" and co-block polymers that have an elastomeric and stiffened sequences.

The energy absorbing elements 110 can be disks or plates having a circular, oval, square, rectangular, triangular or other shaped periphery. The size of the elements will vary widely and will generally range from about 0.05 inches to about 2.0 inches in diameter, and from about ¹⁄₁₆ inches to about ¼ inches in thickness, depending upon the degree of protection required. The energy absorbing elements can have flat or curved upper and/or lower surfaces. Curved surfaces can assist to deflect an incoming projectile so as to redirect the impact force and distribute the force over a wider area. Generally, energy absorbing elements 110 can be positioned in an imbricated pattern whereby edges of elements 110 in one of the layers overlap the edges of elements in the other layer. For example, the positions of the energy absorbing elements 110 are staggered between layers so that the intersections or joints between the elements of one layer are aligned with the mid portions of the elements of the adjacent layer, and thereby misaligned with or offset from the junctions between elements of the adjacent layer. In FIG. 1, in a given layer, adjacent elements 110 abut each other. However, in an alternative embodiment, in a given layer, adjacent elements 110 are slightly spaced from one another. The above mentioned imbrication or overlapping of elements 110 between layers advantageously occludes or covers spaces between the elements as a path is traced through device 100 from its top to its bottom (i.e., in the generally vertical direction).

The energy absorbing elements 110 can be positioned adjoining, or alternatively slightly spaced from, one another, and simply held in place by the polymer matrix 101. Alternatively, the energy absorbing elements 110 can include means for flexibly connecting to adjoining energy absorbing elements. For example, energy absorbing elements 120 include a substantially flat body portion 121 having peripheral notches 122 and ridges 123. Energy absorbing elements 120 are positioned so that the ridge 123 of one energy absorbing element 120 engages the notch 122 of the adjoining energy absorbing element 120 so as to form an interlocking joint which is nevertheless flexible, and which functions as a hinge. That is, the adjacent energy absorbing elements are highly resistant to lateral disengagement but are hingedly movable relative to each other. Alternative embodiments of device 100 need not include both elements 110 and 120. For example, such alternative embodiments may include only elements 110, or alternatively, only elements 120.

Figure 2:
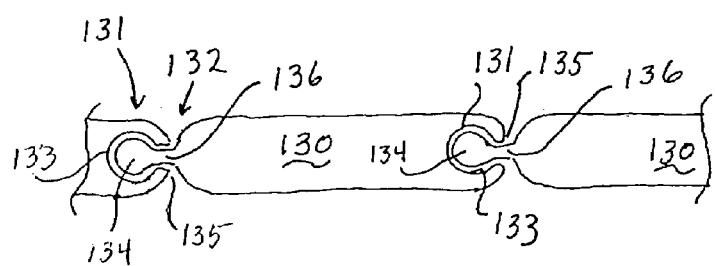
FIG. 2 is a side view of energy absorbing elements.

Referring now to FIG. 2, a hinge joint structure is illustrated wherein energy absorbing elements 130 each include at least one edge having a lengthwise extending socket 131, and an opposite edge having a lengthwise projection 132. The projection 132 of one energy absorbing element 130 is adapted to engage the socket 131 of an adjacent energy absorbing element so as to form a hinge connection between the energy absorbing elements. The socket 131 includes a cylindrical channel 133 and an opening 135. The projection 132 includes a cylindrical pin 134 and an extension 136. The pin 134 is adapted to engage channel 133 with enough clearance so as to permit hinged relative movement. However, the diameter of pin 134 is larger than the opening 135 so as to prevent disengagement.

The energy absorbing elements 110 are preferably fabricated by alternately layering tape casts of the ceramic material (e.g., YSZ and/or alumina) with foils of the strain rate sensitive metal material (e.g., $Fe_3Al$) to form a multi-layered lamellar structured stack, which is then compressed and fired to burn off the binders, and then sintered at a temperature of from about 1,100° C. to about 1,400° C. under a dry gas, e.g., nitrogen. Alternatively, the ceramic disks (including, e.g., the stabilized zirconia and alumina) can be fired individually or separately and then joined to the strain rate sensitive foil in a separate firing process. In a preferred embodiment, the energy absorbing elements include from about 6% to about 13% by weight of alumina, from about 8% to about 18% by weight of YSZ and from about 9% to about 19% by weight of $Fe_3Al$. The sintering temperature is preferably chosen to optimize the densification of the energy absorbing element material, joining and adhesion of layers, while minimizing grain growth to provide transformation toughening of the YSZ. The energy absorbing elements 110 dissipate the impact energy by, for example, phase transformation and crack deflection. The strain rate sensitive polymer (e.g. PEEK) can be incorporated in the energy absorbing elements by, for example, as a coating and/or can be layered into the structure as alternating layers of polymer and ceramic/metal composite.

Figure 3:
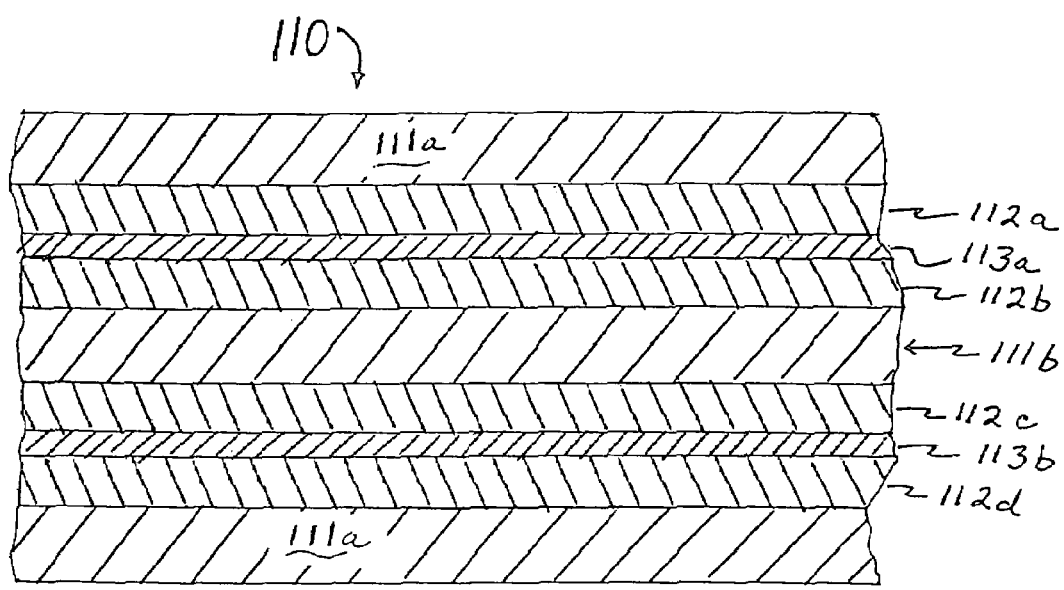
FIG. 3 is a sectional side view of a portion of a multilayered energy absorbing element.

Referring now to FIG. 3, a diagrammatic sectional view of a portion of an energy absorbing element 110 is illustrated. Energy absorbing element 110 includes an optional outer coating 111a of a strain rate sensitive polymer (e.g., PEEK), and a multi-layered structure comprising layers 112a, 112b, 112c and 112d of ceramic material such as described above, and layers 113a and 113b of strain rate sensitive metal (e.g., $Fe_3Al$). The energy absorbing element 110 can also, if desired, include multiple interior layers of strain rate sensitive polymer 111b. The numbers and arrangement of layers can be varied as well as the thickness of the individual layers.

Referring again to FIG. 1, in addition to the embedded layers of energy absorbing elements (110, 120 and/or 130), the matrix 101 can be a flexible polymer sheet having embedded therein one or more sheets of ballistic fabric 140 made from aramid, UHMWPE, or other such ballistic fabric material. Alternatively, the ballistic fabric 140 can be secured to an external surface 102 of the polymer matrix 101.

Figure 4:
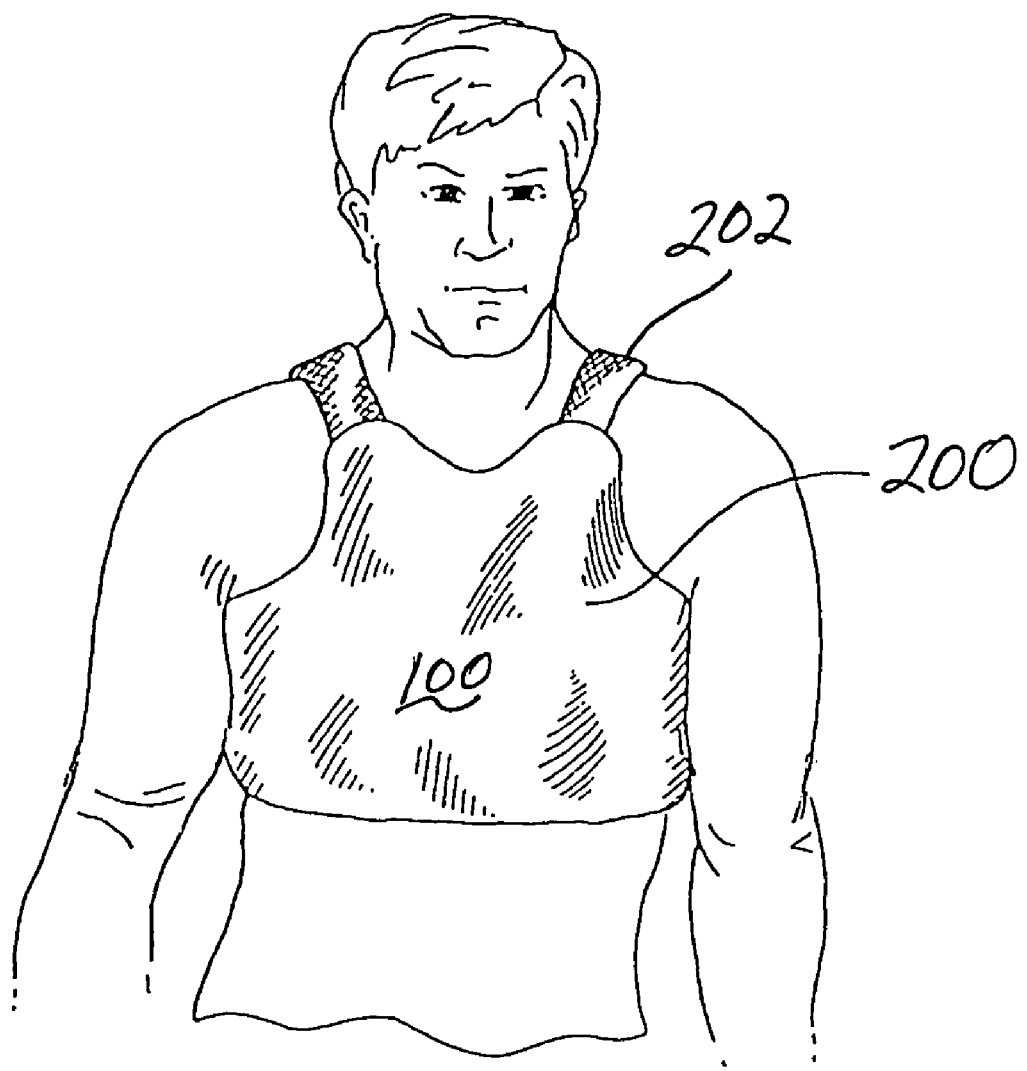
FIG. 4 illustrates body armor including the impact resistant device of the invention.

Referring now to FIG. 4, body armor vest 200 includes at least an impact resistant device 100 which is configured and dimensioned to be worn by a human being. Attachment devices such as straps 202 for securing the body armor vest to a wearer are commonly known and can be used herein. Other attachment devices include, for example, buckles, buttons, snaps, latches and the like.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. An impact resistant device comprising:
   a plurality of energy absorbing elements connected to a flexible support, each element comprising:
   multiple layers of a ceramic material comprising alumina; and
   multiple layers of a metal alloy comprising $Fe_3Al$ alternated with the multiple ceramic layers.

2. The impact resistant device of claim 1, wherein the plurality of energy absorbing elements are arranged in at least two layers in an imbricated pattern.

3. The impact resistant device of claim 2, wherein each energy absorbing element is hingedly connected to at least one other adjacent energy absorbing element in the same layer.

4. The impact resistant device of claim 1, wherein the metal alloy further comprises titanium boride and/or chromium.

5. The impact resistant device of claim 1, wherein each element further comprises a layer of strain rate sensitive polymer having a modulus of elasticity of at least 3 GPa at a strain rate of $1000\ sec^{-1}$.

6. The impact resistant device of claim 5, wherein the strain rate sensitive polymer comprises a polyether ether ketone.

7. The impact resistant device of claim 1, further comprising a layer of ballistic fabric.

8. The impact resistant device of claim 7, wherein the ballistic fabric is fabricated from aramid fibers or polyethylene.

9. The impact resistant device of claim 1, configured and dimensioned to be worn by a human being.

10. The impact resistant device of claim 9, further comprising an attachment means for securing the device to a human body.

11. The impact resistant device of claim 1, wherein each of the energy absorbing elements is a disk shape.

12. The impact resistant device of claim 11, wherein each of the energy absorbing elements has a round circumference.

13. The impact resistant device of claim 11, wherein the energy absorbing elements have a square, rectangular, or triangular shaped periphery.

14. The impact resistant device of claim 11, wherein each of the elements has:
a diameter in the range of about 0.05 inch to about 2.0 inches; and
a thickness in the range of about 1/16 inch to about 1/4 inch.

15. The impact resistant device of claim 14, further comprising multiple layers of a strain sensitive polymer at least some of which are interspersed between the ceramic layers and the metal alloy layers.

16. The impact resistant device of claim 1, wherein each element further comprises at least one layer of a strain rate sensitive polymer.

17. The impact resistant device of claim 16, wherein the at least one strain rate sensitive polymer layer includes an interior polymer layer.

18. The impact resistant device of claim 16, wherein the polymer layer has a modulus of elasticity of at least 3 GPa at 1000 sec−1.

19. The impact resistant device of claim 18, wherein the strain rate sensitive polymer layer comprises polyether ether ketone ("PEEK").

20. The impact resistant device of claim 17, wherein the at least one strain rate sensitive polymer layer further includes a polymer layer forming an outer surface of each element.

21. The impact resistant device of claim 1, wherein each of the metal alloy layers is adhered to a corresponding one of the multiple ceramic layers.

22. An impact resistant device, comprising:
a plurality of energy absorbing elements connected to a flexible support, each element comprising:
a first plurality of layers comprising:
first and second layers of a ceramic material comprising alumina; and
a first layer of a metal alloy comprising $Fe_3Al$ sandwiched between the first and second ceramic layers; and
a second plurality of layers comprising:
third and fourth layers of a ceramic material comprising alumina; and
a second layer of a metal alloy comprising $Fe_3Al$ sandwiched between the third and fourth ceramic layers.

23. The device of claim 22, further comprising:
a layer of strain rate sensitive polymer having a modulus of elasticity of at least 3 GPa at a strain rate of 1000 $sec^{-1}$ between the first plurality of layers and the second plurality of layers.

24. The device of claim 22, wherein the first and second ceramic layers are adhered to the first metal alloy layer and the third and fourth ceramic layers are adhered to the second metal alloy layer.

25. An impact resistant device, comprising:
a flexible support matrix configured and dimensioned to be worn by a human being; and
a plurality of energy absorbing elements embedded in the flexible support matrix and arranged in at least two layers in an imbricated pattern, each of the elements including:
multiple layers of a ceramic material comprising alumina; and
multiple layers of a metal alloy comprising $Fe_3Al$ alternated with the multiple ceramic layers.

26. The device of claim 25, wherein the flexible support matrix is one of a polymer and a ballistic fabric.

27. The device of claim 25, wherein the strain rate sensitive material includes a polymer having a modulus of elasticity of at least 3 GPa at 1000 $sec^{-1}$ strain rate.

28. The device of claim 25, wherein each of the elements has:
a diameter in the range of about 0.05 inch to about 2.0 inches; and
a thickness in the range of about 1/16 inch to about 1/4 inch.

29. The device of claim 25, wherein each of the elements in at least one of the two layers is movably coupled to an adjacent one of the elements in the same layer.

30. The device of claim 25, wherein each of the elements in one of the two layers is slightly spaced from adjacent elements in that layer.

* * * * *